UNITED STATES PATENT OFFICE.

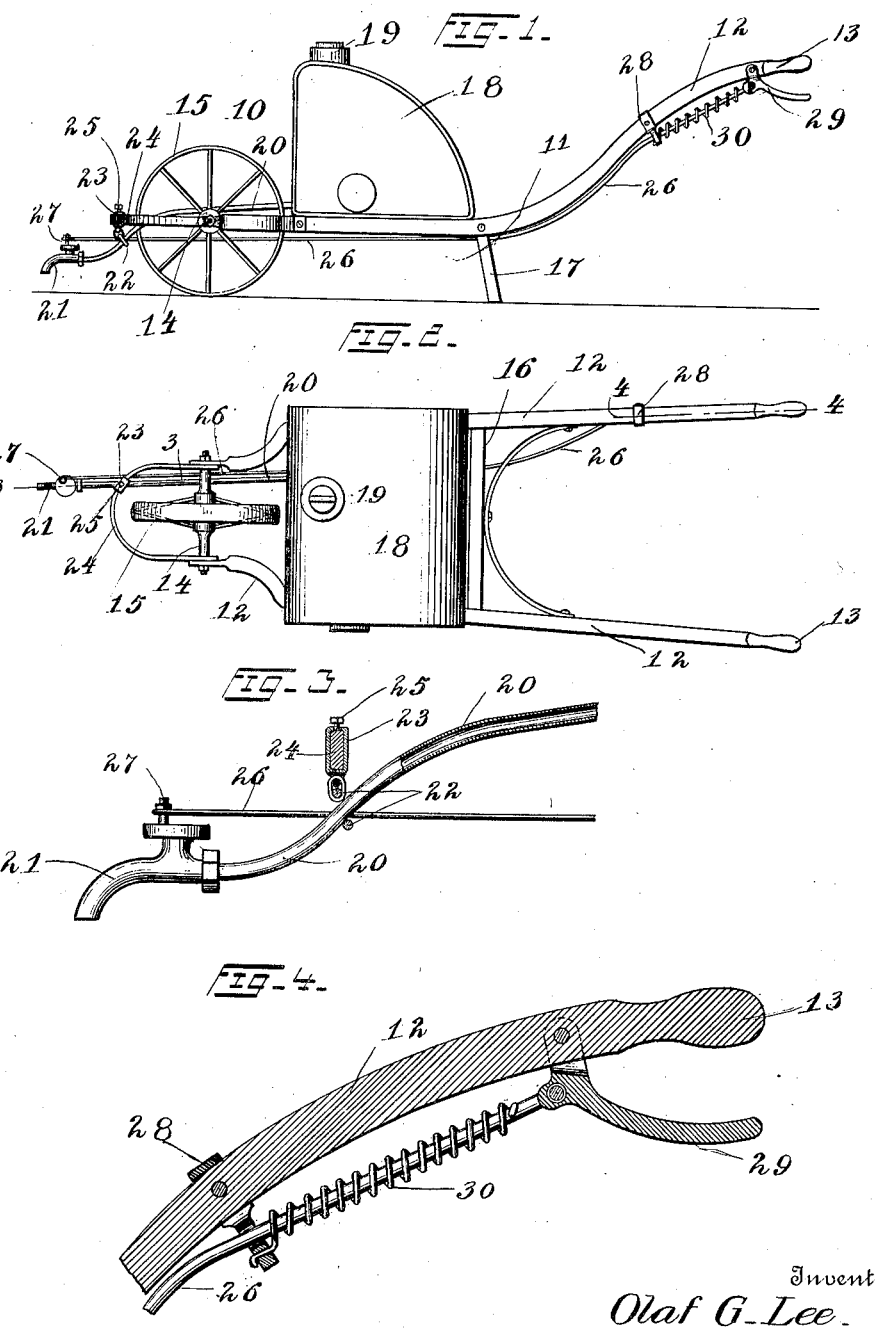

OLAF G. LEE, OF SPOKANE, WASHINGTON.

LINE-MARKING DEVICE FOR PLAYGROUNDS.

1,050,669.  Specification of Letters Patent.  Patented Jan. 14, 1913.

Application filed August 31, 1912. Serial No. 718,119.

*To all whom it may concern:*

Be it known that I, OLAF G. LEE, a citizen of the United States, residing at Spokane, in the county of Spokane and State of Washington, have invented new and useful Improvements in Line-Marking Devices for Playgrounds, of which the following is a specification.

An object of the invention is to provide a line marking device for tennis courts, baseball grounds and the like.

The invention embodies, among other features, a vehicle which is advanced over the ground and provided with a suitable container adapted to contain a marking fluid or a pigment such as chalk or slaked lime with means for permitting the marking fluid to flow on to the ground as the vehicle is advanced along the ground.

In the further disclosure of the invention reference is to be had to the accompanying drawings, constituting a part of this specification, in which similar characters of reference denote corresponding parts in all the views, and in which:

Figure 1 is a side elevation of the device; Fig. 2 is a plan view; Fig. 3 is a vertical sectional view taken substantially on the line 3—3 in Fig. 2; and Fig. 4 is a vertical sectional view taken on the line 4—4 in Fig. 2.

Referring more particularly to the views, use is made of a vehicle 10 including a frame 11 consisting of side arms 12 terminating at the rear ends in handles 13 and having the forward ends thereof bifurcated, an axle 14 of a wheel 15 being journaled in the bifurcated forward portions of the side arms 12 as shown, the mentioned side arms being connected by suitable cross braces 16 with uprights 17 secured to the side arms 12 at substantially the medial portions of the side arms, the said uprights being arranged to depend from the side arms and support the frame 11 in horizontal position, the forward end of the frame being supported by the wheel 15, as will be understood.

A tank 18 is mounted on the frame 11, said tank being provided with a filling opening normally closed by a cap 19 and extending forwardly from the lower front end of the tank is a pipe 20, the said pipe being arranged to project forwardly beyond the wheel 15 and to one side thereof with a suitable faucet 21 secured to the forward extremity of the pipe, the said faucet being normally spaced a slight distance from the ground and the forward end of the said pipe being supported by passing the pipe through a sleeve 22 swiveled on a collar 23 mounted to slide on a supporting member 24, the said supporting member being preferably formed of a single piece of spring-like wire bent in a U-shape with the ends or extremities of the supporting member rigidly secured to the forward ends of the side arms 12, as shown. A set screw 25 has threaded connection with the collar 23 and is adapted to engage the supporting member 24 to secure the collar rigidly on the supporting member.

An actuating rod 26 has the forward end thereof connected to a stem 27 of the valve of the faucet 21, and the said actuating rod extends rearwardly adjacent one of the side arms 12 and is then bent to pass beneath the side arm and pass through a guide member 28 secured to the side arm a distance from the rear end thereof, the rear extremity of the actuating rod having pivotal connection with a suitable lever 29 mounted to swing on the side arm carrying the guide member 28, adjacent the handle end of the side arm, a contractile helical spring 30 being arranged to encircle the actuating rod 26 with an end of the spring secured to the actuating rod and the other end of the spring abutting against the guide member 28, thus normally holding the actuating rod in a forward position to retain the valve of the faucet 21 in closed position, it being understood that the faucet is of any type in which the valve thereof is unseated to open the faucet when a rearward pull is exerted on the stem of the faucet.

In the operation of the device, the vehicle is advanced along the ground with the wheel 15 operating over a line marked on the ground and adjacent which it is desired to form a white line. The tank 18 having been previously filled with a marking fluid, slaked lime or the like, it will be readily seen that when the lever 29 is actuated, thus moving the actuating rod 26 against the action of the spring 30, the valve of the faucet 21 will be opened, thus permitting the contents of the tank to flow through the open end of the faucet and on to the ground, it being further seen that a line will thus be formed in view of the fact that the vehicle is being continually advanced over the ground. It should be noted that the pipe 20 is arranged to one side of the wheel 15 so that when the white line is produced the wheel will not in any manner pass over the white line so that in forming the line the same will not be spoiled or mutilated by the device described herein, it being further noted that by arranging the pipe to pass through the sleeve 22 having swivel connection with the collar 23, the faucet 21 can be adjusted nearer to or farther from the temporary line over which the wheel of the vehicle passes. The pipe 20 is preferably of a flexible nature in order to permit of the heretofore mentioned adjustment of the faucet nearer to or farther from the temporary line, and similarly the actuating rod 26 is also preferably of a flexible nature, sufficient to permit of a slight bending of the rod at the point where the same connects with the lever 29, while at the same time the actuating rod will be sufficiently strong to prevent buckling due to the contractile action of the spring 30.

As mentioned heretofore, the device described is particularly adaptable for use on tennis courts, baseball grounds or other playgrounds. It will be understood, however, that I do not limit myself to the particular use of the device as mentioned herein and that various changes may be made in the construction disclosed in the drawings without departing from the spirit of the invention, the scope of the invention being defined in the appended claims.

Having thus described my invention, I claim:

1. In a marker, the combination with a vehicle including a frame, of a tank supported on the frame, a pipe extending forwardly from the tank, a supporting member having rigid connection with the frame, a collar adjustably mounted on the supporting member, a sleeve swivelly mounted on the collar and having the said pipe passed therethrough, a faucet on the forward end of the pipe, an adjusting rod having connection with the faucet and extending rearwardly along the said frame, a lever on the frame and having pivotal connection with the said actuating rod, and a spring encircling the said actuating rod and engaging the same.

2. In a device of the class described, the combination with a vehicle including a frame, of a tank supported on the frame, a U-shaped supporting member on the forward end of the frame, a pipe extending forwardly from the said tank and having adjustable connection with the said supporting member, a faucet on the said pipe, and actuating means connected with the said faucet and extending rearwardly along the said frame.

In testimony whereof I affix my signature in presence of two witnesses.

OLAF G. LEE.

Witnesses:
A. E. DENT,
S. IVERSON.